Patented Apr. 5, 1949

2,465,991

UNITED STATES PATENT OFFICE 2,465,991

PURIFICATION OF POLYMERIZABLE ESTERS

Arthur W. Anderson and Carleton A. Sperati, North Arlington, N. J., assignors to E. I. du Pont de Nemours & Company, Wilmington, Del., a corporation of Delaware No Drawing. Application May 22, 1946, Serial No. 671,667

3 Claims. (Cl. 260—486)

This invention relates to the purification of polymerizable monomeric esters and, more particularly, to a method of purifying crude reaction mixtures of high boiling polymerizable monomeric esters.

The conventional method of purifying monomeric materials is by distillation in vacuo. In such distillations it is often essential to add an inhibitor to the still pot containing the monomeric material in order to prevent or at least suppress polymerization before the distillation has been completed. However, it has been found that with some high boiling polymerizable monomeric esters, the boiling point of the monomer is so high and its activation energy so low that at the boiling point of the monomer even under very low pressures almost no monomer is obtained as such but practically all of the material is polymerized, in spite of large amounts of inhibitor present. Therefore, other means of purification must be resorted to.

The art of aqueous extraction as a means of purifying materials is old but, unfortunately, this method results in undesirable suspensions and emulsions of the monomeric materials, especially if the monomer molecule contains certain groupings of atoms which are known to exhibit emulsifying and detergent properties. The formation of emulsions with the monomeric material makes it extremely difficult to effect a separation, not to speak of the lack of economy of such a separation.

An object of the present invention is to provide a method of purifying crude reaction mixtures containing high boiling polymerizable monomeric esters which cannot be purified by ordinary methods known to the art. Another object is to effect a rapid separation of such polymerizable monomers from their crude reaction mixtures. A further object is to provide an economical method of effecting this separation and purification without appreciable loss of the monomer due to hydrolysis. A still further object is to provide a method of obtaining monomer and comonomer compositions of sufficient purity to be useful in making cast, impregnated, and laminated articles by polymerization of said compositions. Other objects will be apparent from the description of the invention given hereinafter.

The above objects are accomplished according to the present invention by mixing a crude reaction mixture containing the monomeric ester or esters to be purified dissolved in a hydrocarbon solvent, with a solution comprising an alkali metal hydroxide in water, the concentration of the alkali metal hydroxide being sufficient so that the specific gravity of the solution is appreciably greater than that of the reaction mixture, allowing the reaction mixture to stand until stratified into two layers, and then removing one of the layers. This treatment may be repeated several times until the aqueous layer separating out no longer shows any sign of discoloration.

This invention has been found particularly applicable to the purification of those comonomers described in the copending application of Arthur W. Anderson and Edward O. Ramler, Serial No. 671,395, of common assignee. The comonomers referred to are compositions comprising the dimethacrylate esters of a mixture of glycols, examples of said mixture of glycols being polyethylene glycol 200, polyethylene glycol 300, polyethylene glycol 400, etc., wherein the numbers 200, 300 and 400 refer to the average molecular weight of the mixture of glycols.

The invention may be utilized to purify simple monomers as well as the comonomers referred to, examples of the former being diethylene glycol dimethacrylate, triethylene glycol dimethacrylate, glycerol trimethacrylate, nonaethylene glycol dimethacrylate, tetraethylene glycol dimethacrylate, polymethylene glycol dimethacrylates; the corresponding esters of acrylic acid and other alpha-substituted acrylic acids; and, in fact, any high boiling polymerizable monomeric ester having sufficiently low rate of hydrolysis to prevent appreciable losses due to hydrolysis during the contact period with the aqueous alkali solution.

The problem of obtaining purified high boiling polymerizable monomeric esters regardless of which specific ester is involved, is substantially the same in that these esters are normally prepared by esterification of the organic acid dissolved in a liquid hydrocarbon and in the presence of an acid catalyst such as sulfuric acid or p-toluene sulfonic acid. Consequently, the crude reaction mixtures invariably comprise a solution of the monomeric ester in a hydrocarbon solvent together with small quantities of acid, inhibitor, and incidental reaction products. The hydrocarbon solvents may be aromatic hydrocarbons such as benzene or toluene, straight chain aliphatic hydrocarbons such as hexane or heptane, or cyclic hydrocarbons such as methyl cyclohexane. All of these hydrocarbon solvents have a specific gravity less than 1 and the aliphatic hydrocarbons have specific gravities lower than the aromatic hydrocarbons.

The present invention resides in part in the discovery that these crude reaction mixtures can be mixed with aqueous alkali metal hydroxide solutions, the resulting mixture stratified in two layers, and the aqueous layer removed without undue loss of the monomeric ester as a result of hydrolysis, provided a relatively concentrated alkali metal hydroxide solution is used which has a specific gravity at least 0.15 greater than the specific gravity of the reaction mixture. Unexpectedly, it was found the separation of the two layers of the resulting mixture proceeded at such a rapid rate that there was very little hydrolysis of the monomeric ester even though the concentration of alkali metal hydroxide was quite high. On the other hand, the use of very dilute alkali metal hydroxide solutions was not at all satisfactory.

It has further been discovered the concentration of the alkali metal hydroxide may be somewhat reduced by using with it a solution of any chemically neutral, water-soluble, organic compound which will raise the specific gravity of the washing liquid. When using a solution of an alkali metal hydroxide, the concentration of the solution normally should be at least 15%, by weight, of alkali metal hydroxide in order to get a satisfactory difference in specific gravity to insure a high rate of separation into two layers of the mixture. Preferably, the concentration should be about 20% of alkali metal hydroxide, by weight. However, concentrations of alkali metal hydroxide as low as 10% may be used satisfactorily in combination with, for example, a 60% aqueous sucrose solution since the sucrose increases the effective difference in specific gravities between the crude reaction mixture and the alkali metal hydroxide solution.

In place of sucrose as the water-soluble, organic compound to be used in conjunction with the alkali metal hydroxide solution, there may be used a variety of chemically neutral organic compounds such as glucose, urea, and mixtures of urea and sugars. The concentration of the water-soluble, organic compound may be widely varied but is preferably used in relatively high concentration in order to increase the specific gravity of the solution appreciably. Obviously, the organic compound should have a specific gravity above 1.3 to be effective.

The advantages of employing sugar solutions and the like are not only that less concentrated alkali solutions are required to obtain the same specific gravity of washing medium but there is an increased rate of separation of the hydrocarbon layer of the reaction mixture from the aqueous layer, improved color of the purified polymerizable monomeric esters results, no salting out occurs as with the inorganic salts, and impurities in the reaction mixture are more soluble in the sugar solutions than in the salt solutions which result from reaction of the alkali metal hydroxide with the acid in the crude reaction mixture.

The following examples in which all parts are given by weight, illustrate specific embodiments of the invention.

Example I

The following materials were mixed in a three neck flask fitted with a stirrer:

|  | Parts |
|---|---|
| Polyethylene glycol 200 | 1000 |
| Methacrylic acid | 950 |
| Benzene | 1000 |
| Hydroquinone | 24 |
| Sulfuric acid (conc.) | 35 |

Polyethylene glycol 200 is a mixture of various glycols, which mixture has an average M. W. of 200±15. A typical analysis follows:

| Weight percent | Material | Molecular Weight | Average Molecular Weight |
|---|---|---|---|
| 2.78 | Monoethylene glycol | 62 | is 205.5. |
| 5.6 | Diethylene glycol | 106 | |
| 18.47 | Triethylene glycol | 150 | |
| 18.1 | Tetraethylene glycol | 194 | |
| 12.25 | Pentaethylene glycol | 238 | |
| 4.6 | Hexaethylene glycol | 282 | |

The distillation analysis was then stopped with 36.5% higher boiling glycols left as residue.

The flask was properly equipped for removal of the water formed during esterification while returning the benzene carrier to the reaction flask. The mixture was heated with stirring and the distillation continued until the rate of removal of water was nearly zero.

The crude reaction mixture containing the dimethacrylic acid esters of polyethylene glycol 200 was then stirred with 100 parts of a 20% by weight solution of sodium hydroxide in water. After stirring for three minutes, the layers were allowed to separate for approximately ten minutes, and the lower aqueous layer containing the sodium hydroxide, sodium methacrylate, sodium salts of hydroquinone and sulfuric acid and aqueous solutions of other impurities, was then drawn off. The upper layer containing the monomeric ester dissolved in benzene, was again treated this time with 50 parts of a similar solution of sodium hydroxide, allowed to stand, and separated. This process was repeated six times until the lower aqueous layer was essentially colorless and did not change in color upon further extraction. The benzene layer was given a final wash with a 15% by weight solution of sodium chloride.

The resulting comonomeric solution was at this stage in purified condition particularly adaptable for use as a laminating or impregnating resin, or, after removal of the benzene, as a casting resin, or for many other applications. The yield of dimethacrylic acid esters of polyethylene glycol 200, after stripping the benzene under reduced pressure, was 75% by weight of the theoretical.

Example II

A crude reaction mixture containing the dimethacrylic acid esters of polyethylene glycol 200 was prepared as in Example I except that heptane was used in place of benzene. The reaction mixture was first cooled to −10° C. and the supernatant liquor decanted from a small quantity of solid polymer which had been formed during the esterification reaction.

The reaction mixture with the polymer removed, i. e., the supernatant liquor above, was agitated at room temperature with 100 parts of a 20% sodium hydroxide solution and then 100 parts of a 60% solution of sucrose were added and the mixture agitated for three to five minutes. The mixture was allowed to stand for ten minutes and the lower aqueous layer drawn off. This washing procedure was repeated four times and a final wash using 100 parts of 60% sucrose solution given the heptane solution to remove free alkali and to clarify the heptane. After removal of the heptane under reduced pressure, the dimethacrylic acid esters of polyethylene glycol 200 were obtained in purified form.

It will be understood that the above examples are merely illustrative and that the invention is broadly applicable to high boiling polymerizable monomeric esters generally. If an ester is very readily susceptible to hydrolysis, some loss due to hydrolysis is bound to occur and, to that extent, the present invention is not as efficient as applied to such an ester. With most esters, the loss due to hydrolysis is negligible when the invention is properly carried out.

Many modifications of the invention are possible without departing from the scope thereof. Thus, the specific gravity of the alkali solution may vary depending on the choice of the solvent used. Referring to Example I as an illustration, the crude reaction mixture after esterification using benzene as the solvent has a specific gravity of approximately 0.9 to 1.0, whereas the specific gravity of the purified dimethacrylic acid esters of polyethylene glycol 200 is about 1.08. For this particular case an alkali solution having a specific gravity ranging from 1.16 to 1.27 is satisfactory (i. e. 15–25% by weight of aqueous sodium hydroxide solution). This gives an effective difference in specific gravities between the crude reaction mixture and the sodium hydroxide solution of from 0.16 to 0.28, which is a sufficiently wide difference so that the rate of separation is high enough to be satisfactory. On the other hand, it can be seen readily that the use of a dilute (e. g. 2%) sodium hydroxide solution having a specific gravity of 1.02 would provide a wash liquid with substantially the same specific gravity as that of the reaction mixture and thus result in a very slow rate of separation. Of course, other alkali solutions such as potassium hydroxide may be used in place of sodium hydroxide and hydrocarbons having a lower specific gravity than that of benzene provide a greater effective difference.

Another variable in the purification step is the time of contact of the alkaline solution with the crude reaction mixture, and this factor should be balanced with the specific gravity of the alkali metal hydroxide solution, the concentration of alkali in the solution, and the rate of hydrolysis of the particular polymerizable monomer or comonomer mixture at the particular washing temperature employed, so that a negligible loss of monomer occurs due to hydrolysis. Referring again to Example I, under the particular conditions employed, a rather high concentration of sodium hydroxide solution may be used for washing at room temperature with economically short contact times, resulting in a yield of purified comonomer of 70–75% of the theoretical, with only a negligible loss of comonomer due to hydrolysis. In general, from three to eight wash treatments are required to obtain a purified product depending on the conditions and materials used. The washings may be carried out continuously instead of batch-wise if desired.

The process of this invention has been found particularly suitable for the commercial preparation of high boiling polymerizable monomeric and comonomeric esters wherein high losses may be avoided by employing the procedure of this invention. In general the difference in specific gravities between the crude reaction mixture and the aqueous alkali solution should be between 0.15 and 0.30. The optimum difference in specific gravity is approximately 0.2.

The high boiling polymerizable monomers prepared according to the process of this invention may be subjected to the action of heat, light, ozone, peroxides and other well known polymerization activators in order to convert them to polymers. The polymerization may be carried out in bulk, in aqueous emulsion or dispersion, or in a suitable solvent. More particularly, the polyfunctional high boiling polymerizable monomers and comonomers have been found to have great practical utility since they may be cast into a variety of shaped articles, they may be used to form surface coatings having good scratch-resistance and useful in the manufacture of optical pieces, they yield useful impregnating and laminating compositions, and in general may be used as non-volatile, thermosetting addition-type polymerizable monomers.

It is within the scope of this invention to mix other materials with the comonomeric compositions in order to facilitate handling or modify the properties of the compositions for specific applications. Thus to the comonomer compositions prior to polymerization may be added various monofunctional monomers and/or their polymers and copolymers, examples of which are acrylic and alkacrylic esters and their derivatives, vinyl esters, vinyl halides, vinyl ester-halides, cellulose derivatives, etc. Besides the other polymers and copolymers, there may also be added pigments, dyes, fillers, polymerization inhibitors, polymerization activators, solvents, and the like.

As many apparently widely different embodiments of this invention may be made without departing from the spirit and scope thereof, it is to be understood that the invention is not limited to the specific embodiments thereof except as defined in the appended claims.

We claim:

1. Process of purifying at least one monomeric ester of the group consisting of the high boiling esters of acrylic and alpha-substituted acrylic acids, contained in a crude reaction mixture comprising a hydrocarbon solvent for said monomeric ester, which process comprises mixing said reaction mixture with an aqueous solution of an alkali metal hydroxide and a chemically neutral, water-soluble, organic substance from the group consisting of sucrose, glucose, urea, and mixtures of urea and sugars, the concentration of said alkali metal hydroxide being at least 10% and the concentration of said alkali metal hydroxide and said organic compound being adjusted so that the specific gravity of said solution is appreciably greater than the specific gravity of said reaction mixture, allowing the resulting mixture to stand until stratified into two layers, and then removing one of said layers.

2. Process of purifying at least one monomeric ester of the group consisting of the high boiling esters of acrylic and alpha-substituted acrylic acids, contained in a crude reaction mixture comprising a hydrocarbon solvent for said monomeric ester, which process comprises mixing said reaction mixture with an aqueous solution of an alkali metal hydroxide and sucrose, the concentration of said alkali metal hydroxide being at least 10% and the concentration of said alkali metal hydroxide and said sucrose being adjusted so that the specific gravity of said solution is between 0.15 and 0.30 greater than the specific gravity of said reaction mixture, allowing the resulting mixture to stand until stratified into two layers, and then removing one of said layers.

3. Process of purifying a high boiling monomeric dimethacrylate ester of a polyethylene glycol contained in a crude reaction mixture comprising benzene as a solvent for said monomeric ester, which process comprises mixing said reaction mixture with an aqueous solution of an alkali metal hydroxide and sucrose, the concentration of said alkali metal hydroxide being at least 10% and the concentration of said alkali metal hydroxide and said sucrose being adjusted so that the specific gravity of said solution is between 0.15 and 0.30 greater than the specific gravity of said reaction mixture, allowing the resulting mixture to stand until stratified into two layers, and then removing one of said layers.

ARTHUR W. ANDERSON.
CARLETON A. SPERATI.

REFERENCES CITED

The following references are of record in the file of this patent:

UNITED STATES PATENTS

| Number | Name | Date |
|---|---|---|
| 1,993,089 | Crawford | Mar. 5, 1935 |
| 2,042,458 | Crawford | June 2, 1936 |
| 2,266,004 | Coes | Dec. 16, 1941 |
| 2,314,443 | Crawford | Mar. 23, 1943 |
| 2,388,844 | Hasche et al. | Nov. 13, 1945 |
| 2,401,261 | MacMullen | May 28, 1946 |
| 2,404,267 | Barnes | July 16, 1946 |
| 2,414,589 | Fein et al. | Jan. 21, 1947 |